United States Patent
Fujiyama et al.

(10) Patent No.: US 7,652,689 B2
(45) Date of Patent: Jan. 26, 2010

(54) PICTURE TAKING DEVICE AND PICTURE RESTORATION METHOD

(75) Inventors: Naoyuki Fujiyama, Tokyo (JP); Tetsuya Kuno, Tokyo (JP); Kazuhiro Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 397 days.

(21) Appl. No.: 11/631,264

(22) PCT Filed: Apr. 26, 2005

(86) PCT No.: PCT/JP2005/007882

§ 371 (c)(1),
(2), (4) Date: Dec. 29, 2006

(87) PCT Pub. No.: WO2006/038334

PCT Pub. Date: Apr. 13, 2006

(65) Prior Publication Data

US 2008/0291286 A1    Nov. 27, 2008

(30) Foreign Application Priority Data

Sep. 30, 2004    (JP)    ............................. 2004-288038

(51) Int. Cl.
*H04N 5/228*    (2006.01)
(52) U.S. Cl. ...................... 348/222.1; 348/362; 348/364
(58) Field of Classification Search ............... 348/222.1, 348/294–297, 208.4, 362, 364; 382/254, 382/255, 278, 280, 282
See application file for complete search history.

(56) References Cited

U.S. PATENT DOCUMENTS

| | | | |
|---|---|---|---|
| 6,272,289 B1 * | 8/2001 | Washisu | 396/55 |
| 6,909,796 B2 * | 6/2005 | Pomata et al. | 382/131 |
| 7,152,021 B2 * | 12/2006 | Alattar et al. | 702/191 |
| 7,176,962 B2 * | 2/2007 | Ejima | 348/208.4 |
| 7,447,378 B2 * | 11/2008 | Kondo et al. | 382/266 |
| 7,477,305 B2 * | 1/2009 | Kondo et al. | 348/297 |
| 2001/0021224 A1 * | 9/2001 | Larkin et al. | 375/240.16 |

(Continued)

FOREIGN PATENT DOCUMENTS

JP    5-107622 A    4/1993

(Continued)

OTHER PUBLICATIONS

Sucheta Chitale, Blur Identification and Correction for a Given Imaging System, Mar. 25-28,1999, Southeastcon '99, Proceeding. IEEE, Digital Object Identifier 10.1109/SECON. 1999.766138, pp. 268-273.*

*Primary Examiner*—Tuan Ho
*Assistant Examiner*—Don Nguyen
(74) *Attorney, Agent, or Firm*—Birch, Stewart, Kolasch & Birch, LLP

(57) ABSTRACT

In a digital still camera, the amount of blur when a picture is taken is calculated from a first picture captured with a high-speed electronic shutter and a second picture captured with a normal shutter speed (5), and the blur in the picture captured with the normal shutter speed, which is degraded by the blur, is corrected through digital signal processing, by applying a picture restoration algorithm (6). Blur can be corrected by a simple device, without requiring an angular velocity sensor or a circuit to process its output in order to reduce the effect of camera shake.

8 Claims, 6 Drawing Sheets

U.S. PATENT DOCUMENTS

| | | | |
|---|---|---|---|
| 2001/0030708 A1* | 10/2001 | Ide et al. | 348/362 |
| 2002/0028009 A1* | 3/2002 | Pomata et al. | 382/131 |
| 2002/0122133 A1 | 9/2002 | Ejima | |
| 2003/0160875 A1* | 8/2003 | Mitsunaga et al. | 348/222.1 |
| 2003/0197793 A1* | 10/2003 | Mitsunaga et al. | 348/222.1 |
| 2004/0109068 A1* | 6/2004 | Mitsunaga et al. | 348/222.1 |
| 2004/0189837 A1* | 9/2004 | Kido | 348/241 |
| 2004/0201731 A1* | 10/2004 | Kakinuma et al. | 348/229.1 |
| 2005/0134700 A1* | 6/2005 | Shiraishi | 348/222.1 |
| 2005/0231603 A1* | 10/2005 | Poon | 348/208.99 |
| 2006/0013479 A1* | 1/2006 | Trimeche et al. | 382/167 |

FOREIGN PATENT DOCUMENTS

| | | |
|---|---|---|
| JP | 2002-247444 A | 8/2002 |
| JP | 2002-305682 A | 10/2002 |
| JP | 2002-315007 A | 10/2002 |

* cited by examiner

PICTURE TAKING DEVICE AND PICTURE RESTORATION METHOD

FIELD OF THE INVENTION

The present invention relates to a picture taking device and picture restoration method for correcting a picture that was blurred due to hand movement or other movement when the picture was taken and restoring it to a picture that is free of the effects of such movement. More particularly, the invention relates to a picture taking device in a digital still camera or a camera built into a mobile phone etc.

BACKGROUND ART

When a silver salt film camera or a digital still camera is held in the hand to photograph a subject, the camera may shake due to hand movement and the picture taken may be degraded by blurring in the direction of the hand movement. Conventional methods of avoiding such blurring when taking pictures include methods of driving the optical system to suppress blurring and methods of driving the image sensor to suppress blurring.

Devices employing a type of sensor such as an angular velocity sensor or an angular acceleration sensor are fairly commonly used as devices for sensing camera shake to suppress blurring. These devices are mounted in digital still cameras to detect and predict the amount and direction of hand movement, so that pictures can be taken without blurring.

An exemplary conventional blurring correction method using these sensors is disclosed in Patent Document 1, which has a shake detection means for detecting variations of the optical axis of the photographic lens as an angular velocity or an oscillatory angular acceleration; when the shutter release switch is depressed, the shutter driving mechanism releases the shutter after the shake detected by the shake detection means has passed through a maximum value; this enables correction of blurring. The method disclosed in Patent Document 1, however, causes the shutter to be released with a temporal lag from the time originally intended by the photographer; a resulting problem is that the scene actually photographed differs from the scene the photographer intended to photograph.

A solution to this problem is disclosed in Patent Document 2. The solution in Patent Document 2 has an image processing device for deblurring pictures taken by a picture taking device that combines a sensor and the continuous shooting mode, comprising a continuous shooting unit for taking pictures of a subject continuously at predetermined intervals, thereby obtaining a plurality of pictures, a shake sensing unit for sensing information concerning shaking of the picture taking device at the continuous shooting timings, and a camera shake compensation unit for correcting the blur in at least one picture among the plurality of pictures based on the shake information obtained by the shake sensing unit and the plurality of pictures obtained by the continuous shooting unit, thereby enabling the picture to be deblurred.

Patent Document 1: Japanese Patent Application Publication No. H5-107622 (p. 2, FIG. 2)

Patent Document 2: Japanese Patent Application Publication No. 2002-247444 (p. 3, FIG. 1 and FIG. 2)

DISCLOSURE OF THE INVENTION

Problems to be Solved by the Invention

The technology disclosed in Patent Documents 1 and 2, however, is problematic in that sensing means such as an angular velocity sensor and its control circuit etc. are required, and accordingly the structure of the device becomes complex.

Another drawback of the methods in Patent Documents 1 and 2 is that although they can correct for camera shake they cannot correct other kinds of blurring. For example, when a building is photographed from the window of a speeding train or car, a blur similar to that caused by camera shake may occur, but the actual cause of the blur is not camera shake, so the angular velocity sensor or other sensing means cannot detect the blur, and accordingly it is impossible to correct the blur.

Means of Solution of the Problems

The present invention provides a picture taking device comprising an imaging element for capturing a first picture in a first charge accumulation time, then successively capturing a second picture in a second charge accumulation time longer than the first charge accumulation time, a mathematical picture model estimator for estimating a relation between the first and second pictures, based on an assumption that the relation between the first and second pictures is linear, and a picture restorer for using the estimated relation to improve the second picture by correcting faults that have occurred therein.

Effect of the Invention

The present invention can deblur a picture without using a sensor to measure camera shake. The correctable blur need not even be due to camera shake; it is also possible to deblur a picture, taken from a rapidly moving vehicle, of a scene external to the vehicle.

EXPLANATION OF REFERENCE CHARACTERS

1 imaging element, 2 amplifying means, 3 analog-to-digital converter, 4 frame memory, 5 mathematical picture model estimator, 6 picture restorer, 7 control unit, 8 timing generator, 9 picture signal processor, 31 input terminal, 32 input terminal, 33 output terminal, 41 order setter, 42 mutual correlation coefficient calculator, 43 autocorrelation coefficient calculator, 44 linear simultaneous equation solution calculator, 45 estimated impulse response function value modifier, 51 input terminal, 52 input terminal, 53 output terminal, 61 DFT calculator, 62 inverse filter deriver, 63 inverse filtering calculator, 64 IDFT calculator, 65 summer, 66 threshold setter, 67 comparator, 68 switch, 71 input terminal, 72 output terminal, 83 spatial frequency domain representation calculator, 84 picture size setting means, 85 feature extraction operator setting means, 86 constrained least mean squares filter configuring means, 87 Lagrangian undetermined multiplier setting means

BEST MODE OF PRACTICING THE INVENTION

Embodiments of the invention will now be described with reference to the attached drawings. The embodiments described below are suitable mainly as methods of compensating for camera shake in a digital still camera, but the technology can also be applied in other picture taking devices.

First Embodiment

Figure 1:
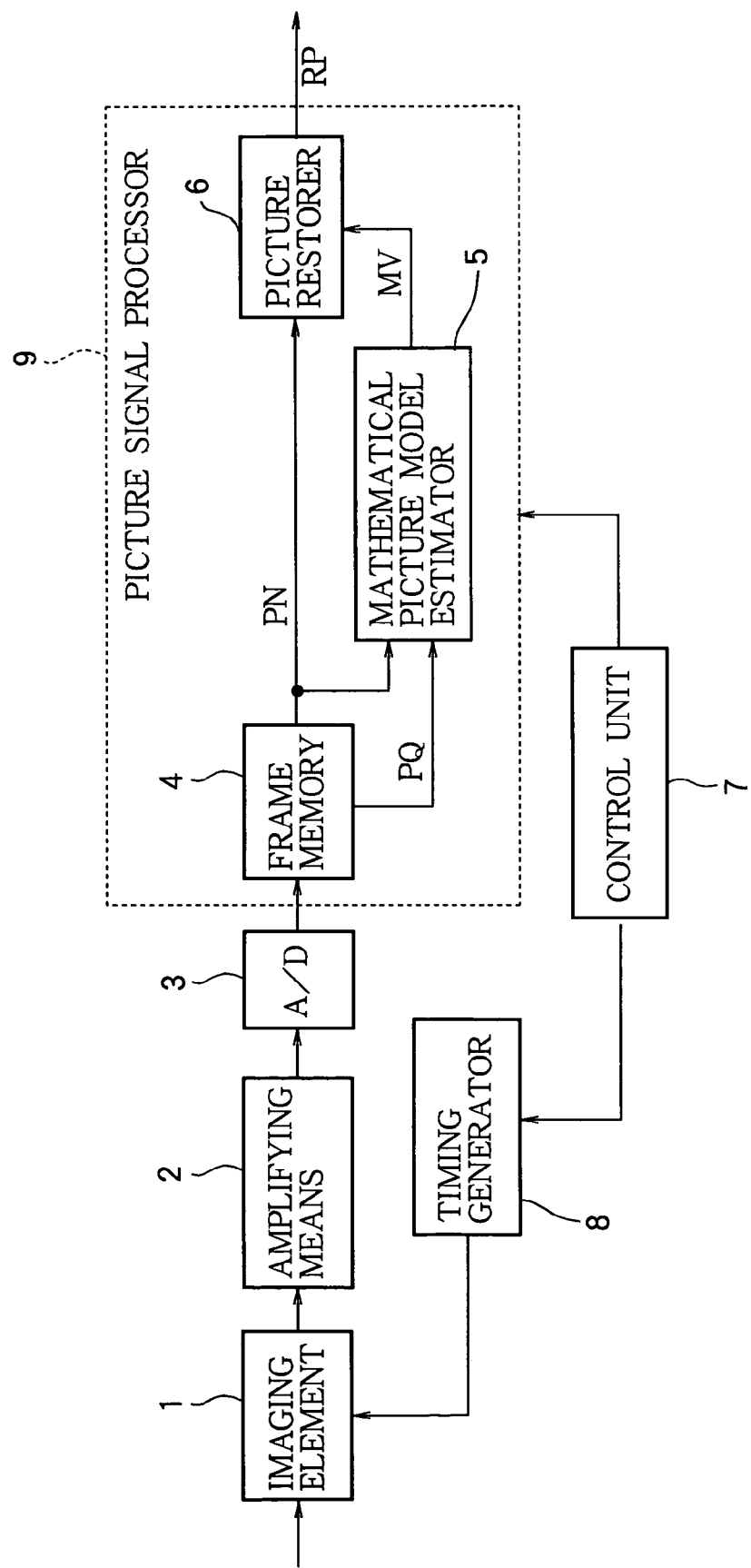
FIG. 1 is a block diagram showing the structure of a picture taking device in a first embodiment.
Figure 2:
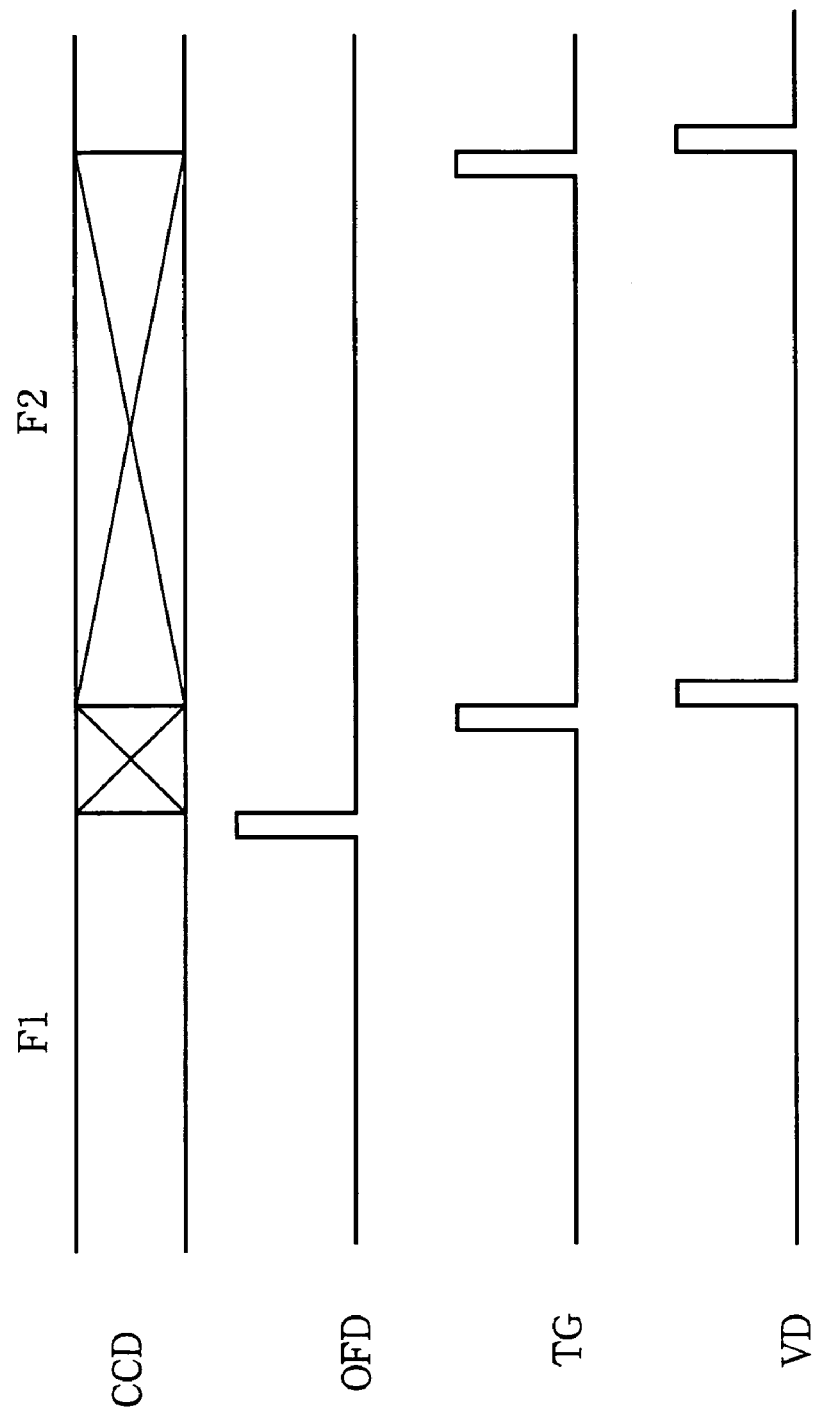
FIG. 2 is a drawing illustrating a method of driving the imaging element of the picture taking device in the first embodiment.
Figure 3:
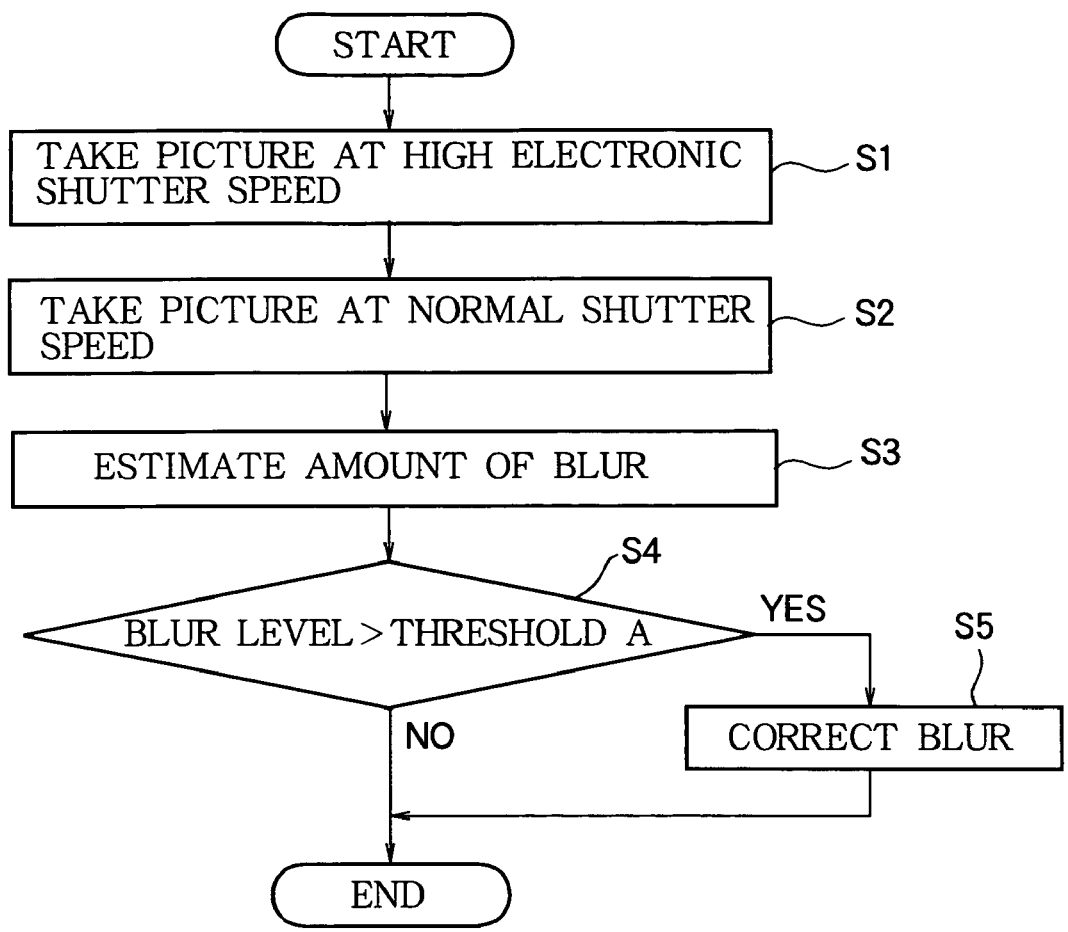
FIG. 3 illustrates the flow of processing carried out by the picture restoring means in the first embodiment.
Figure 4:
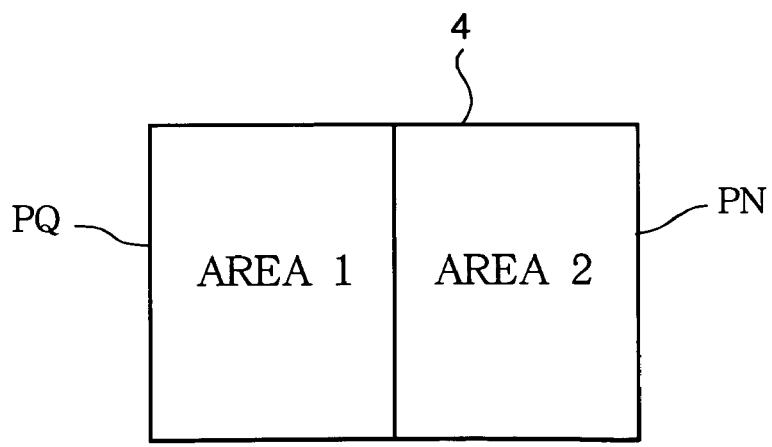
FIG. 4 is a diagram showing the structure of the frame memory in the first embodiment.
Figure 5:
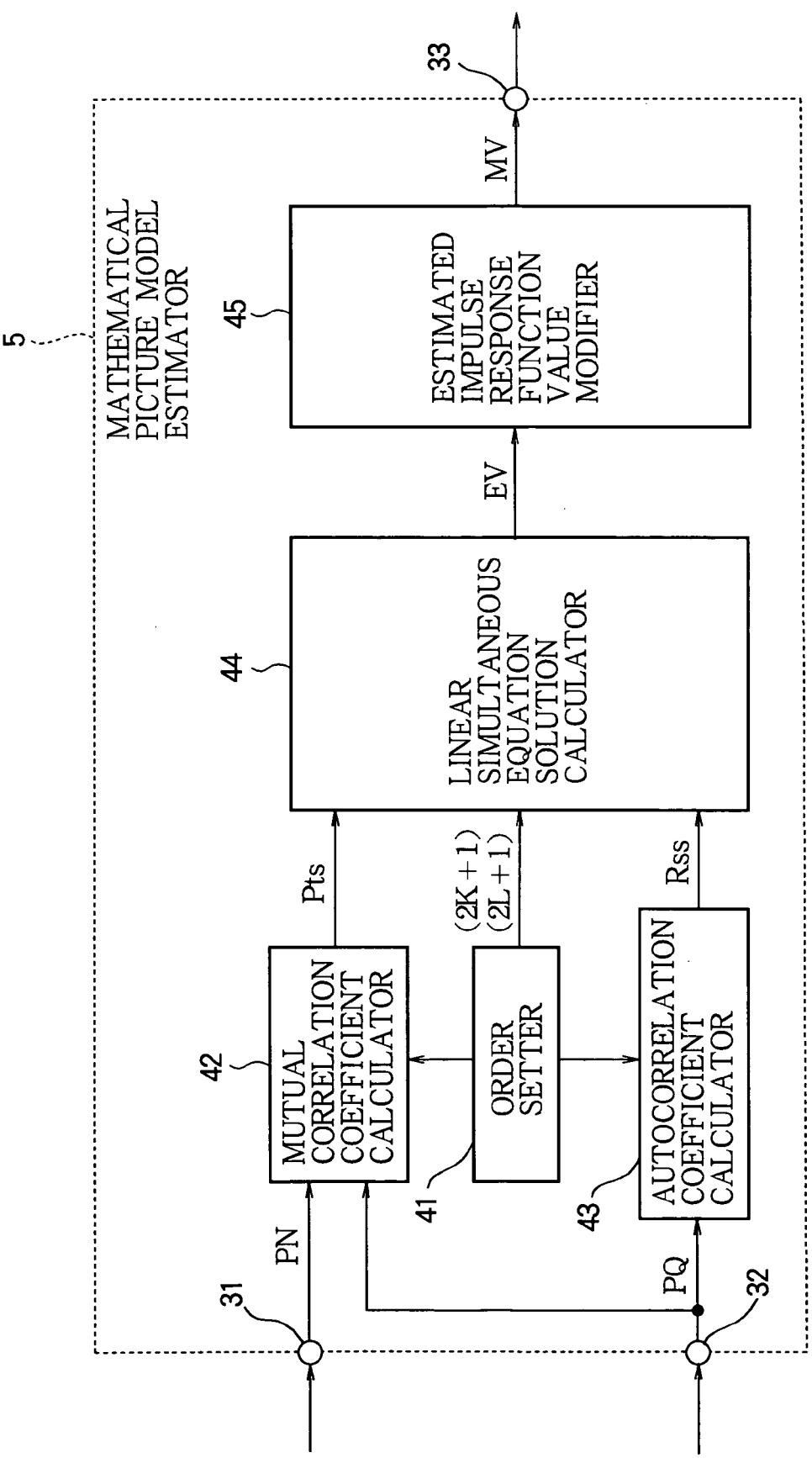
FIG. 5 is a block diagram showing the structure of the mathematical picture model estimator in the first embodiment.
Figure 6:
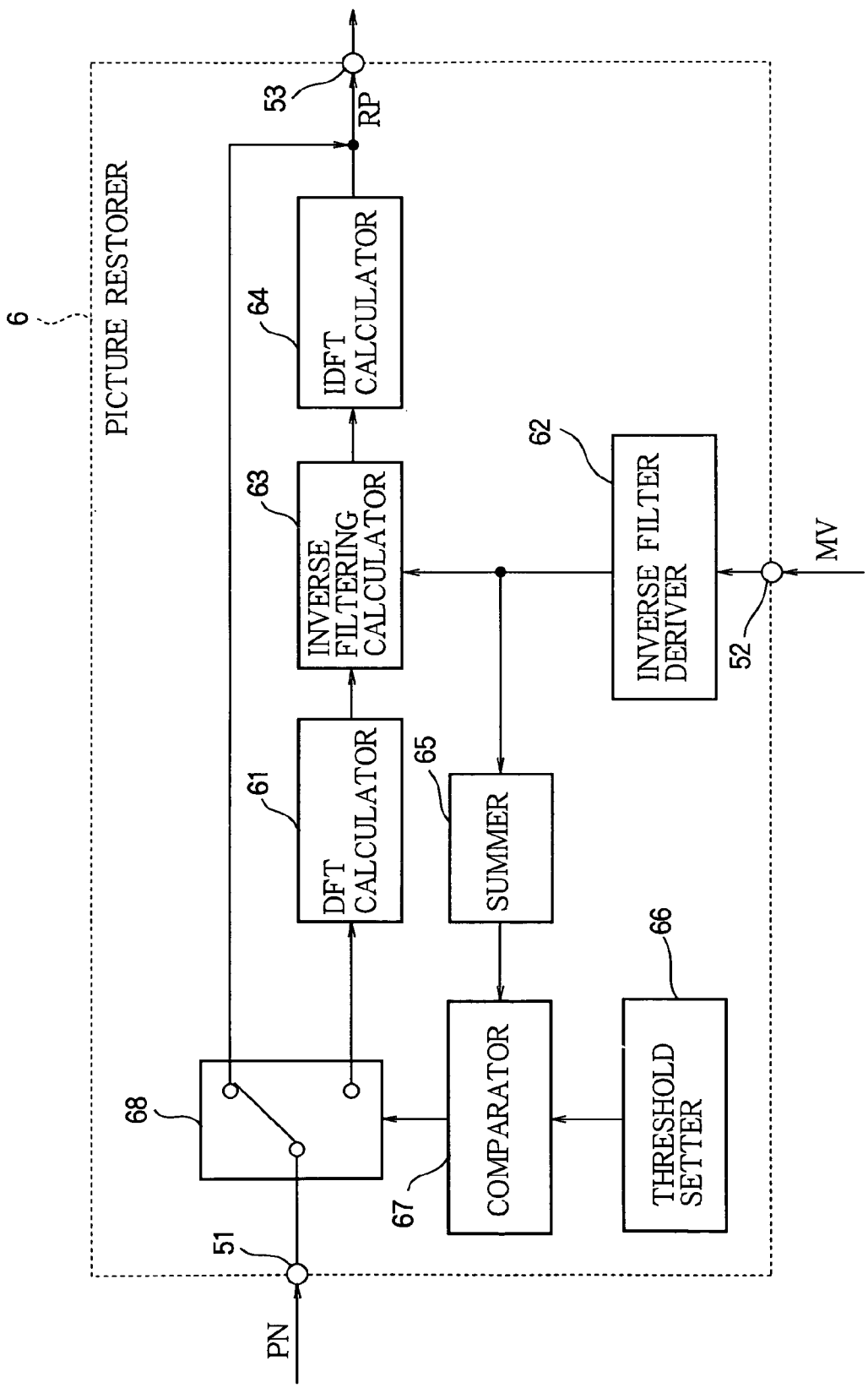
FIG. 6 is a block diagram showing the structure of the picture restorer in the first embodiment when implemented by digital signal processing.

FIG. 1 is a block diagram showing the structure of a picture taking device in a first embodiment useful for practicing this invention; FIG. 2 is a drawing illustrating a method of driving the imaging element in the picture taking device; FIG. 3 is a drawing illustrating the flow of processing carried out by the picture restoration means by means of digital signal processing; FIG. 4 is a diagram showing the structure of the frame memory; FIG. 5 is a block diagram showing the structure of the mathematical picture model estimator for calculating the amount of camera shake by using two pictures: a first captured picture (hereinafter referred to as a picture taken at a high electronic shutter speed) PQ and a second captured picture (hereinafter referred to as a picture taken at the normal shutter speed) PN; FIG. 6 is a block diagram showing the structure of the picture restorer, which uses digital signal processing to execute an image restoring algorithm on the picture PN taken at the normal shutter speed.

FIG. 1 shows the structure of a picture taking device embodying the present invention. The imaging element 1 comprises a solid-state imaging element such as a CCD sensor or CMOS image sensor. An amplifying means 2 amplifies the output signal from the imaging element 1. An analog-to-digital (A/D) converter 3 converts the output signal from the amplifying means 2 to a digital signal, and outputs it to a frame memory 4. The frame memory 4 has two picture storage areas as shown in FIG. 4, and can store two captured pictures, one being a picture PQ captured at a high electronic shutter speed, the other being a picture PN captured at the normal shutter speed. A mathematical picture model estimator 5 receives the two pictures captured and stored in the frame memory 4, assumes the two pictures to be the input and output of a mathematical picture model, estimates the mathematical model (by estimating an impulse response function), and outputs the parameters included in the model to a picture restorer 6. More specifically, it estimates the mathematical relationship between the two captured pictures as an impulse response function, modifies the estimated values, and outputs the modified values MV to the picture restorer 6. When the picture restorer 6 receives the parameters included in the mathematical model from the mathematical picture model estimator 5, of the two stored pictures read from the frame memory 4, it deblurs the picture PN taken at the normal shutter speed, and outputs it as a restored picture RP. The signal processing section comprising the frame memory 4, mathematical picture model estimator 5, and picture restorer 6 that restores the captured picture is referred to as a picture signal processor 9. A control unit 7 outputs control signals that control the picture signal processor 9 and a timing generator (TG) 8, which outputs driving waveforms for driving the imaging element 1. Driven by the driving waveforms output from the timing generator 8, the imaging element 1 opto-electrically converts an optical image formed on the sensor, and outputs the opto-electrically converted electrical signal.

The method of driving the imaging element 1 during photography will next be described with reference to FIG. 2. In FIG. 2, the part marked CCD shows charge accumulation in the imaging element 1, and the boxes with diagonal lines indicate the charge accumulation time during which the imaging element 1 performs opto-electrical conversion. The signal marked VD has one vertical pulse per frame and is used for frame synchronization etc. OFD is an overflow drain pulse, a high-voltage pulse used to dissipate charge accumulated in the imaging element 1. All the accumulated charge is discharged by the OFD pulse. TG is a timing gate pulse, a pulse for reading accumulated charges out into a transfer unit in the imaging element 1. The charges thus read are converted to voltage values and output by a floating diffusion amplifier (FDA). Accordingly, the period from the OFD pulse to the TG pulse is the charge accumulation time, and bringing the OFD pulse closer to the TG pulse shortens the charge accumulation time. This corresponds to opening and closing an optical shutter quickly, or taking a picture at a high electronic shutter speed. If no OFD pulse appears between two consecutive TG pulses, the period between the TG pulses becomes the charge accumulation time.

In the first frame F1 shown in FIG. 2, the period from the OFD pulse to the TG pulse is 1/n-th of a frame, and charge is accumulated in the period corresponding to 1/n-th of the single frame interval (n is a positive integer). In the next frame F2, charge is accumulated for a period of one frame interval (between two consecutive TG pulses). The imaging element 1 is driven in such a manner that two pictures are taken successively, one being taken with charge accumulated for 1/n-th of a frame (the first charge accumulation time), corresponding to the high electronic shutter speed, and the other being taken with charge accumulated for one frame (the second charge accumulation time), corresponding to the normal shutter speed. The charge accumulation time corresponding to the normal shutter speed is specified as one frame here, but the time can be any period in which a sufficiently good signal-to-noise ratio (SNR) can be obtained; the time can be optimized in consideration of sensitivity, dark current, and other characteristics of the imaging element 1. The charge accumulation time corresponding to the high electronic shutter speed is specified as 1/n-th of the charge accumulation time corresponding to the normal shutter speed here. As the value of n increases, the effect of the present invention in reducing blur in the restored picture RP increases. If the value of n is too large, however, the SNR of the picture taken at the speed corresponding to the high electronic shutter speed becomes extremely poor, lowering the precision with which the mathematical picture model can be estimated. An appropriate value of n is in the range from about three to about ten. The value of n is limited to an integer in this description, but this limitation is due to the use of a currently popular control driver and is not an essential limitation of the present invention.

Taking a picture at the high electronic shutter speed first and then at the normal shutter speed has the advantage that the picture finally obtained is not delayed from the photographer's shooting timing, but the reverse order is also possible if the blur is not too fast. The two pictures are preferably taken in succession as shown in FIG. 2, but an interval of about one frame between the two pictures, owing to hardware restrictions or the like, will not impair the effect of the invention.

The sequence described above allows a picture to be taken at the normal shutter speed following a picture taken at the high electronic shutter speed. These pictures are taken in an instant, one after the other, and they do not differ greatly. The picture taken at the normal shutter speed is readily degraded by blur while the picture taken at the high electronic shutter speed is only slightly affected by blur because of its short exposure time.

The picture PQ captured at the high electronic shutter speed, however, is always taken as a very dark picture because of the short charge accumulation time. The low SNR makes it hard to eliminate noise accurately by digital signal processing, because the picture contains much noise of a random nature.

The picture taken at the normal shutter speed has a high SNR because the charge accumulation time is generally more appropriate, but the long charge accumulation time causes the picture to be degraded by blur if hand movement results in a substantial amount of camera shake while the picture is being taken. It is difficult to infer the amount of blur only from a picture degraded by the blur. This problem has been intensively studied, but without practical results.

Consideration of the characteristics of two pictures taken almost simultaneously with different charge accumulation times led the present inventor to develop a picture taking method and picture restoration method that allow a high-quality blur-free picture to be obtained. The processing flow is shown in FIG. 3 and will now be described in further detail.

The picture taking device of the present invention takes a picture at a high electronic shutter speed (S1) and then, very shortly thereafter, takes a picture of the same subject at a normal shutter speed (S2). The two pictures are captured in accordance with the timing diagram shown in FIG. 2 without the photographer being aware that two pictures have been taken instead of one. After the two successive pictures are taken, the amount of blur occurring in the picture PN captured at the normal shutter speed is estimated with reference to the picture PQ captured at the high electronic shutter speed (S3). The amount of blur is compared with a predetermined threshold A (S4). If the amount of blur is lower than the threshold (No in S4), camera shake compensation is not required, and the camera shake compensation processing ends. If the amount of blur exceeds the threshold (Yes in S4), a picture restoration algorithm is executed by digital signal processing in accordance with the estimated amount of blur, to correct the blurred picture taken at the normal shutter speed (S5). Threshold A may be set to such a level that human vision does not perceive blurring in the picture.

Through the steps described above, any blur occurring in the picture captured at the normal shutter speed can be corrected, and a high-quality picture can be obtained.

The estimation of the amount of blur by the mathematical picture model estimator 5 will be described next.

In the mathematical picture model estimator 5 shown in FIG. 1, the amount of blur occurring in the picture taken at the normal shutter speed is estimated by using another picture taken almost simultaneously at a higher shutter speed. This method will be described in further detail by using equation (1) to express the picture mathematically.

$$t_{i,j} = \sum_{l=-L}^{L} \sum_{k=-K}^{K} h_{k,l} s_{i-k, j-l} + v_{i,j} \quad (1)$$

In the above equation (1), i and j represent the location of a pixel. If the picture has M pixels in the vertical direction on the screen and N pixels in the horizontal direction on the screen, i is an integer ranging from 1 to M and j is an integer ranging from 1 to N. The symbol $s_{i,j}$ represents a pixel signal in the picture PQ captured at the high electronic shutter speed. The symbol $t_{i,j}$ represents a pixel signal in the picture PN captured at the normal shutter speed. The symbol $v_{i,j}$ represents an additional noise component present in the picture taken at the normal shutter speed. The symbol $h_{k,l}$ represents an impulse response function indicating the amount of blur. The quantity 2K+1, calculated from K, represents the order of the impulse response function in the vertical direction on the screen. The quantity 2L+1, calculated from L, represents the order of the impulse response function in the horizontal direction on the screen. The mean values of the picture PQ captured at the high electronic shutter speed and the picture PN captured at the normal shutter speed are assumed to be zero. This assumption can be satisfied by calculating the mean values of the pixel signals of the captured pictures, which are the bias values of the pictures obtained from the imaging element 1, and subtracting the mean values from the corresponding pixel signals. From the statistical properties (ergodicity) of the picture PQ captured at the high electronic shutter speed and the picture PN captured at the normal shutter speed, their expected values can be assumed to be equal the mean value, so that $E[s_{i,j}]=0$ and $E[t_{i,j}]=0$, where $E[\_]$ represents the expected value of _. The additional noise component $v_{i,j}$ is assumed to have the property that $E[s_{i,j} v_{ia,ja}]=0$ (for any ia and ja). This assumption derives from the fact that the additional noise in the picture captured at the normal shutter speed depends hardly at all on the picture captured at the high electronic shutter speed. Both sides of the equation (1) are multiplied by $S_{i-ka, j-la}$ to calculate the expected value, and a set of linear simultaneous equations for $h_{k,l}$ is obtained as given by equation (2).

$$\sum_{l=-L}^{L} \sum_{k=-K}^{K} h_{k,l} R_{ss}(ka-k, la-l) = R_{ts}(ka la) \quad (2)$$

$$(ka = -K, \ldots, K \quad la = -L, \ldots, L)$$

In equation (2), $R_{ss}$(ka−k, la−l) represents the autocorrelation function of the picture PQ captured at the high electronic shutter speed, and $R_{ts}$(ka, la) represents the mutual correlation function of the picture PN captured at the normal shutter speed and the picture PQ captured at the high electronic shutter speed. By calculating the autocorrelation function of the picture PQ captured at the high electronic shutter speed and the mutual correlation function of the picture PN captured at the normal shutter speed and the picture PQ captured at the high electronic shutter speed, the amount of blur $h_{k,l}$ indicated by the impulse response function can be estimated.

The autocorrelation function $R_{ss}(ka-k, la-l)$ and the mutual correlation function $R_{ts}(ka, la)$ included in equation (2) are defined by equations (3) and (4) below.

$$R_{ss}(ka-k, la-l) = \frac{1}{MN}\sum_{i=1}^{M}\sum_{j=1}^{N} s_{i-k,j-l} s_{i-ka,j-la} \quad (3)$$

$$R_{ts}(k, l) = \frac{1}{MN}\sum_{i=1}^{M}\sum_{j=1}^{N} t_{i,j} s_{i-k,j-l} \quad (4)$$

The estimation of the impulse response function indicating the amount of blur will be described in further detail with reference to the block diagram shown in FIG. 5.

The mathematical picture model estimator 5 receives the picture PQ captured at the high electronic shutter speed at an input terminal 31 and the picture PN captured at the normal shutter speed at an input terminal 32, from the frame memory 4. The order setter 41 specifies the orders 2K+1 and 2L+1 of the impulse response function indicating the amount of blur. The mutual correlation coefficient calculator 42 receives these orders, the picture PQ captured at the high electronic shutter speed, and the picture PN captured at the normal shutter speed, and calculates the mutual correlation function $R_{ts}$. The autocorrelation coefficient calculator 43 receives the orders 2K+1 and 2L+1 specified by the order setter 41 and the picture PQ captured at the high electronic shutter speed, and calculates the autocorrelation function $R_{ss}$. The linear simultaneous equation solution calculator 44 receives the mutual correlation function $R_{ts}$ and the autocorrelation function $R_{ss}$ together with the orders 2K+1 and 2L+1, and solves the above set of simultaneous equations to obtain estimated values EV of the impulse response function. The solutions are input to an estimated impulse response function value modifier 45, which normalizes them so that they sum to unity (1). The normalized impulse response function MV (the modified values of the impulse response function), which indicate the amount of blur, are output from an output terminal 33.

The estimated impulse response function value modifier 45 will now be described. The calculations done by the linear simultaneous equation solution calculator 44 are based on the two raw pictures obtained from the imaging element 1, which have different bias values, so if the filter resulting from these calculations is applied to one of the pictures, its bias value will change after filtering. Although degraded by blurring, the picture captured at the normal shutter speed is bright because of its long charge accumulation time, as described earlier. If the blur is corrected by estimating the amount of blur with reference to the picture PQ captured at the high electronic shutter speed with a short charge accumulation time, the corrected picture will be a dark picture having a bias value equivalent to that of the picture PQ captured at the high electronic shutter speed. In order to prevent this from occurring, the estimated impulse response function value modifier 45 performs a normalization operation and outputs the normalized results as the modified values MV of the impulse response function.

The pixel signal $s_{i,j}$ of the picture PQ captured at the high electronic shutter speed and the pixel signal $t_{i,j}$ of the picture PN captured at the normal shutter speed will now be described.

The pixel signals of the two pictures used by the mathematical picture model estimator 5 for estimating the impulse response function indicating the amount of blur may use all of the red, green, and blue components of an RGB picture, or may use just one color component (such as just the green component) to reduce the amount of calculation. The estimate can be obtained in the same way from a YCbCr picture, and may be obtained from just one component (such as the Y component).

The estimation process does not need to use all the M×N pixels of the entire picture; it may be based on a predetermined area in the two pictures. The size of this area must be greater than (2K+1)×(2L+1), the defined range of the impulse response function indicating the amount of blur. More specifically, the number of pixels in the vertical direction must be greater than 2K+1, which is the order of the impulse response function in the vertical direction on the screen, and the number of pixels in the horizontal direction must be greater than 2L+1, which is the order of the impulse response function in the horizontal direction on the screen.

The displacement of the subject in the two pictures will next be explained. Because the estimation method uses correlation functions, information about the positional displacement is included in the calculated autocorrelation function $R_{ss}$ and mutual correlation function $R_{ts}$, and the estimated amount of blur includes the positional displacement. The subject in the picture obtained after correcting the blur in the picture captured at the normal shutter speed is restored to the same position as in the picture PQ captured at the high electronic shutter speed, so the photographer obtains a picture of the subject at the desired instant.

The estimation, based on two pictures, of the amount of blur by the mathematical picture model estimator 5 has been described. Next, a blur correction method using the estimated values and applying a picture restoration algorithm implemented by digital signal processing will be described.

Many picture restoration algorithms have been proposed, as described later; one of the algorithms most appropriate for the present invention will now be described in detail here. This algorithm performs inverse filtering of the impulse response function indicating the blur; the inverse filtering is performed by an inverse filtering calculator 63. The mathematics will now be described in further detail.

The picture restoration algorithm used in the first embodiment uses an inverse filter derived by the constrained least squares method and performs calculations using the impulse response function indicating the amount of blur estimated by the mathematical picture model estimator 5. The inverse filter of the impulse response function indicating the amount of blur is obtained by solving the problem of minimizing the squared norm of an image resulting from feature extraction. The squared norm is calculated as the sum of squares of the components of the vector. The first embodiment uses a method of solving the problem of minimizing the squared norm of edge information extracted by a Laplacian operator used for edge extraction.

The mathematical picture model expressed by equation (1) is represented by vectors and matrices. The components of the restored picture RP to be obtained and the picture PN captured at the normal shutter speed are defined as component column vectors vs and vt taken in dictionary order, and the impulse response function is represented by a matrix H. The Laplacian operator is also represented by a matrix C. The matrices H and C are block Toeplitz matrices and can be approximately diagonalized by using a two-dimensional discrete Fourier transform (DFT) matrix, so the computation can be performed at a high speed.

With the notation given above, if $J_1$ denotes the amount of edge feature extracted from the picture by the Laplacian operator, $J_1$ can be expressed as the squared norm of a vector as follows.

$$J_1 = \|C_{vs}\|^2 \quad (5)$$

Most pictures have a strong correlation between pixels and yield only a small amount of extracted edge, making it plausible to restore the picture by using the constrained least squares method to minimize $J_1$ in equation (5).

Because the blurred picture is described by equation (1), the power $\rho^2$ of additional noise is assumed to be constrained as follows, $$\|vt - Hvs\|^2 = \rho^2 \quad (6)$$

and the picture is restored by solving the minimization problem with the additional constraints given by equations (5) and (6). If the minimizing evaluation function is rewritten by using $\gamma$ to represent the reciprocal of the Lagrangian undetermined multiplier UM, the problem reduces to the minimization of the following expression:

$$J = \|vt - H_{vs}\|^2 - \rho^2 + \gamma \|C_{vs}\|^2 \quad (7)$$

If the restored picture vss is obtained by partial differentiation of equation (7) with respect to the picture vs taken at the high electronic shutter speed, the following expression is obtained:

$$vss = (H^T H + \gamma C^T C)^{-1} H^T vt \quad (8)$$

The above equation (8) contains a large block Toeplitz matrix, and an enormous amount of calculation is required to obtain an exact solution. Approximate diagonalization by using a DFT matrix makes it possible to obtain a solution through a practical amount of calculation as described below. The superscript T in equation (8) represents matrix transposition. Vector components after a DFT is performed on vss and vt are denoted $VSS(v_1, v_2)$ and $T(v_1, v_2)$ respectively. The diagonal components of the approximately diagonalized versions of matrices H and C obtained by use of the DFT matrix are represented as $H(v_1, v_2)$ and $C(v_1, v_2)$ respectively. $v_1 (v_1 = v_{11}$ to $v_{1M})$ and $v_2$ ($v_2 = v_{21}$ to $v_{2N}$) are horizontal and vertical spatial frequency components, respectively. The restored picture in the DFT range is expressed with these components as follows:

$$VSS(v_1, v_2) = \frac{H^*(v_1, v_2)}{|H(v_1, v_2)|^2 + \gamma |C(v_1, v_2)|^2} T(v_1, v_2) \quad (9)$$

($H^*$: complex conjugate of $H$)

The restored picture can be obtained by performing a two-dimensional inverse discrete Fourier transform (IDFT) on $VSS(v_1, v_2)$. The inverse filter $W(v_1, v_2)$ obtained from the impulse response function is expressed as follows.

$$W(v_1, v_2) = \frac{H^*(v_1, v_2)}{|H(v_1, v_2)|^2 + \gamma |C(v_2, v_2)|^2} \quad (10)$$

The processing used to obtain equation (10) and restore the picture will be described in further detail with reference to the block diagram in FIG. 6.

The picture PN captured at the normal shutter speed and degraded by the blur are input to an input terminal 51 from the frame memory 4. The impulse response function indicating the amount of blur estimated by the method described above is input to an input terminal 52 from the mathematical picture model estimator 5. The inverse filter deriver 62 calculates the spatial frequency representation of the inverse filter derived from the constrained least squares method. The threshold setter 66 specifies the threshold A. The summer 65 obtains the sum of the AC components of the inverse filter input from the inverse filter deriver 62 as a blur level and outputs this level to the comparator 67. The comparator 67 compares the input blur level and the threshold A. If the blur level does not exceed the threshold A, degradation caused by the blur is judged not to be visually perceptible, and the switch 68 is set to the upper position to output the picture input from input terminal 51 to the output terminal 53 without performing the picture restoration process. If the blur level exceeds the threshold A, visible degradation caused by the blur is judged to be present, and the switch 68 is set to the lower position to perform the picture restoration process.

Another method of judging the presence or absence of degradation caused by blur will now be described. If the degradation caused by the blur is small, one element of the impulse response function input at input terminal 52 will have an estimated value of unity (1) and all the other elements will have estimated values of zero (0). This condition can be detected and used as the basis for deciding whether to execute camera shake compensation. As yet another method, the mutual correlation coefficient calculator 42 in the mathematical picture model estimator 5 may make a comparison with a threshold.

The picture restoration processing in the first embodiment will next be described. Picture restoration uses an inverse filter derived by the constrained least squares method using the DFT, and the picture restoration processing is performed in the spatial frequency domain. For a two-dimensional DFT of the picture captured at the normal shutter speed, the DFT calculator 61 performs the DFT, and the resulting data are input to the inverse filtering calculator 63. The inverse filter obtained by the inverse filter deriver 62 is also input to the inverse filtering calculator 63, where inverse filtering is performed by multiplying the spatial frequency representation of the picture degraded by the blur by the spatial frequency representation of the inverse filter. The IDFT calculator 64 performs an IDFT to convert the resulting representation of the restored picture in the spatial frequency domain to a representation in the spatial domain. The data output from the IDFT calculator 64 form a deblurred picture and are output from the output terminal 53.

Figure 7:
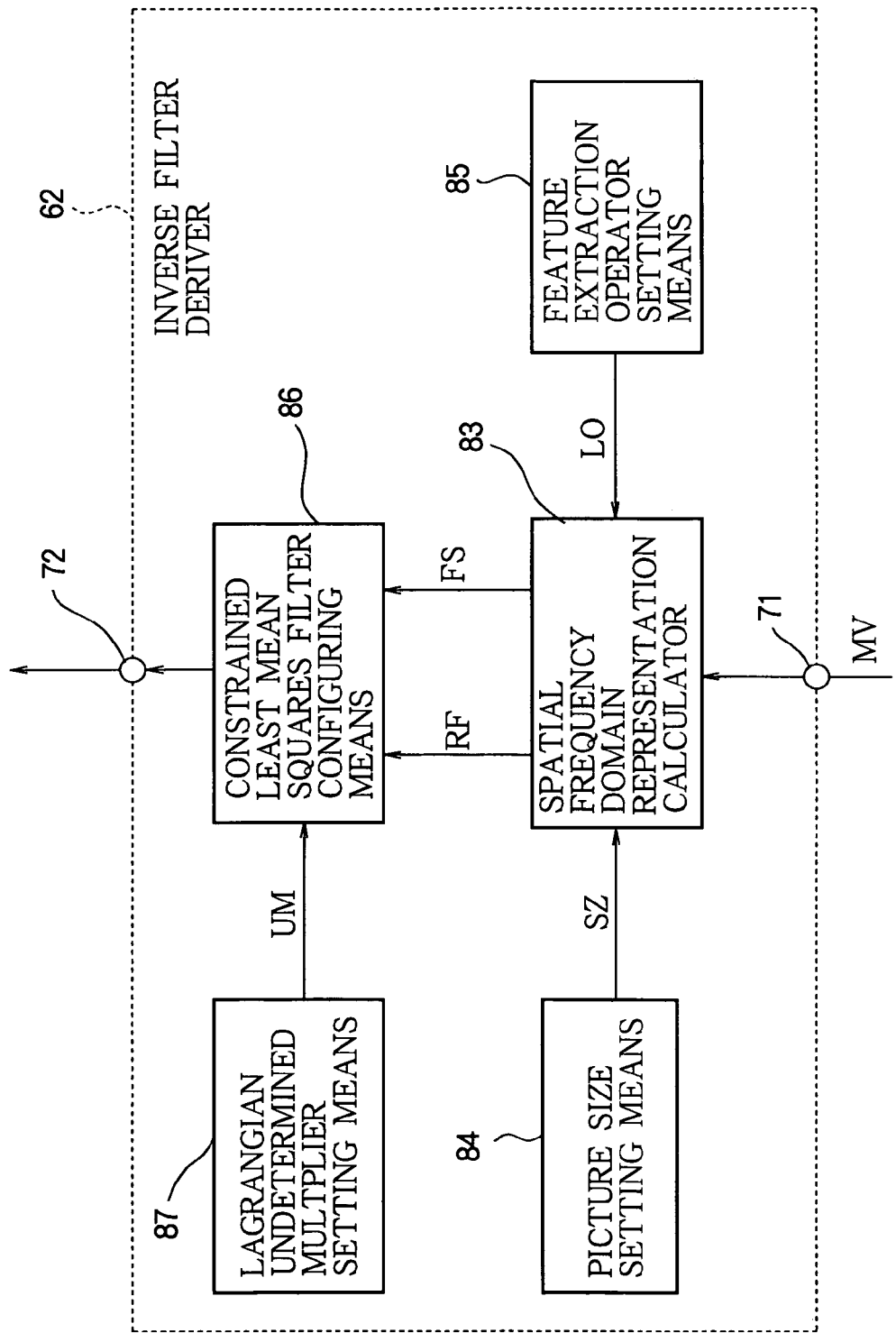
FIG. 7 is a block diagram showing the structure of the inverse filter calculator used in the method of picture restoration by digital signal processing employed in the first embodiment.

The inverse filter deriver 62 will be described in further detail with reference to the block diagram shown in FIG. 7.

The picture size setting means 84 specifies a picture size SZ and provides this value to the spatial frequency domain representation calculator 83. The impulse response function (actually its modified values) MV indicating the amount of blur estimated by the mathematical picture model estimator 5 is input from an input terminal 71. The feature extraction operator setting means 85, which specifies the operator LO to be used to extract features of the picture, specifies the Laplacian operator and inputs this operator to the spatial frequency domain representation calculator 83. The spatial frequency domain representation calculator 83 converts the modified values MV of the impulse response function indicating the amount of blur and the feature extraction operator LO to their representations in the spatial frequency domain (the frequency-domain representation RF of the impulse response function and frequency-domain representation LF of the Laplacian operator) in accordance with the picture size SZ, and outputs these representations to the constrained least mean squares filter configuring means 86. The Lagrangian undetermined multiplier setting means 87 specifies the Lagrangian undetermined multiplier UM included in the constrained least squares method and outputs it to the constrained least mean squares filter configuring means 86. From these input data, the constrained least mean squares filter configuring means 86 calculates the spatial-frequency-domain representation of the inverse filter and outputs the result at an output terminal 72.

A method of executing the picture restoration algorithm by digital signal processing will next be described. When the present invention is applied to a captured picture converted to Y, Cb, and Cr component values, a favorable blur correction can be made by applying the picture restoration algorithm only to the luminance (Y) component because human vision is most sensitive to changes in luminance (Y).

There are many picture restoration algorithms, most of them based on equation (1). Picture restoration algorithms using equation (1) and picture restoration algorithms based on methods derived from a modification of equation (1) require the estimation of the impulse response function by equation (1). Some of the representative picture restoration algorithms used in digital signal processing are the following.

The inverse filtering method uses the inverse function of the impulse response function. If an inverse function cannot be obtained, the inverse filtering method obtains a pseudo-inverse function or a generalized inverse function instead of the inverse function. There are also algorithms using a modification of the feature extraction operator in the constrained least squares method used in the first embodiment, and algorithms derived from a weighted constrained least squares method. These algorithms are generally executed in the spatial frequency domain by using an orthonormal transform. In most cases, the orthonormal transform used is the DFT, DCT, or DST (when the DCT is used, the term DCT spatial frequency domain is often applied). All of these algorithms can be executed by iterative processing in the spatial domain.

Another algorithm assumes statistical characteristics of the raw image of a taken picture and restores the picture in accordance with the assumed characteristics. One representative algorithm uses a Wiener filter, which can be executed in the spatial domain or the spatial frequency domain. There is also a picture restoration algorithm employing a Kalman filter as a type of sequential estimation method using a Wiener filter. The present method can be used to derive algorithms executed, under equation (1), in the spatial domain, frequency domain, or spatial frequency domain. Since the Kalman filter method is a sequential estimation method its result may depend on the initial value. There is an algorithm referred to as a fixed-span smoother that can be executed after the Kalman filter to estimate the initial value. The best restored picture can be obtained by estimating an appropriate initial value, executing the Kalman filter, and then executing the fixed-span smoother. Picture restoration nearly equivalent to picture restoration using the fixed-span smoother can be obtained by using a fixed-lag smoother or a fixed-point smoother. These algorithms can be considered as being picture restoration methods that use maximum a-posteriori (MAP) estimation. There are also MAP estimation methods that use a technique of probability relaxation by simulated annealing.

There are many other methods, including algorithms based on a projection filter and on the entropy maximization principle. Any of the various picture restoration algorithms mentioned above can be used in the present invention; an optimum method may be selected in accordance with the purpose of the application, the performance of the electronic circuit used, the available memory size, and other factors.

Deblurring the degraded picture taken at the normal shutter speed with reference to the picture PQ taken at the high electronic shutter speed immediately before does not require a special sensor such as an angular velocity sensor and its control circuitry etc. Further, the photographer can obtain a corrected picture of the scene at the instant at which the shutter button was depressed. The frame memory 4 only has to store two pictures, so a large memory is not required.

A picture taking device and the picture restoration method for correcting a picture that was blurred due to hand movement or other movement have been described above. This device and method can deblur a picture of a building or other object taken from the window of a rapidly moving vehicle. Blur caused by hand shake and blur in a picture taken from a rapidly moving vehicle are mathematically equivalent.

What is claimed is:

1. A picture taking device comprising:
   an imaging element for capturing a first picture in a first charge accumulation time, and capturing a second picture in a second charge accumulation time longer than the first charge accumulation time, the capturing of the first picture and the capturing of the second picture taking place in succession with each other;
   a mathematical picture model estimator for estimating a relation between the first and second pictures as an impulse response function, based on an assumption that the relation between the first and second pictures is linear;
   an impulse response function value modifier for normalizing the estimated impulse response function to estimate an amount of fault that has occurred in the second picture; and
   a picture restorer for using the estimated impulse response function to improve the second picture by correcting the fault that have occurred therein.

2. The picture taking device of claim 1, wherein the mathematical picture model estimator derives an autocorrelation function of the first picture and a mutual correlation function of the first and second pictures as the relation between the first and second pictures.

3. The picture taking device of claim 2, wherein said autocorrelation function and said mutual correlation function are derived using a picture area with a horizontal size equal to or greater than a horizontal order of the linear relation and a vertical size equal to or greater than a vertical order of the linear relation.

4. The picture taking device of claim 1, wherein from the estimated relation between the first and second pictures, the mathematical picture model estimator estimates an amount of blur that has occurred in the second picture, and the picture restorer performs picture restoration only when the estimated amount of blur exceeds a predetermined threshold.

5. A picture restoration method comprising:
   capturing a first picture in a first charge accumulation time, and capturing a second picture in a second charge accumulation time longer than the first charge accumulation time, the capturing of the first picture and the capturing of the second picture taking place in succession with each other;
   estimating a relation between the first and second pictures as an impulse response function, based on an assumption that the relation between the first and second pictures is linear;
   normalizing the estimated impulse response function to estimate an amount of fault that has occurred in the second picture; and using the estimated impulse response function to improve the second picture by correcting the fault that have occurred therein.

6. The picture restoration method of claim 5, wherein the mathematical picture model estimator derives an autocorrelation function of the first picture and a mutual correlation function of the first and second pictures as the relation between the first and second pictures.

7. The picture restoration method of claim 6, wherein said autocorrelation function and said mutual correlation function are derived using a picture area with a horizontal size equal to or greater than a horizontal order of the linear relation and a vertical size equal to or greater than a vertical order of the linear relation.

8. The picture restoration method of claim 5, further comprising estimating, from the estimated relation between the first and second pictures, an amount of blur that has occurred in the second picture, picture restoration being performed only when the estimated amount of blur exceeds a predetermined threshold.

* * * * *